Jan. 10, 1961 O. I. STEIGERWALT 2,968,036
RADIANT ENERGY SIGNALLING SYSTEM
Filed July 12, 1957
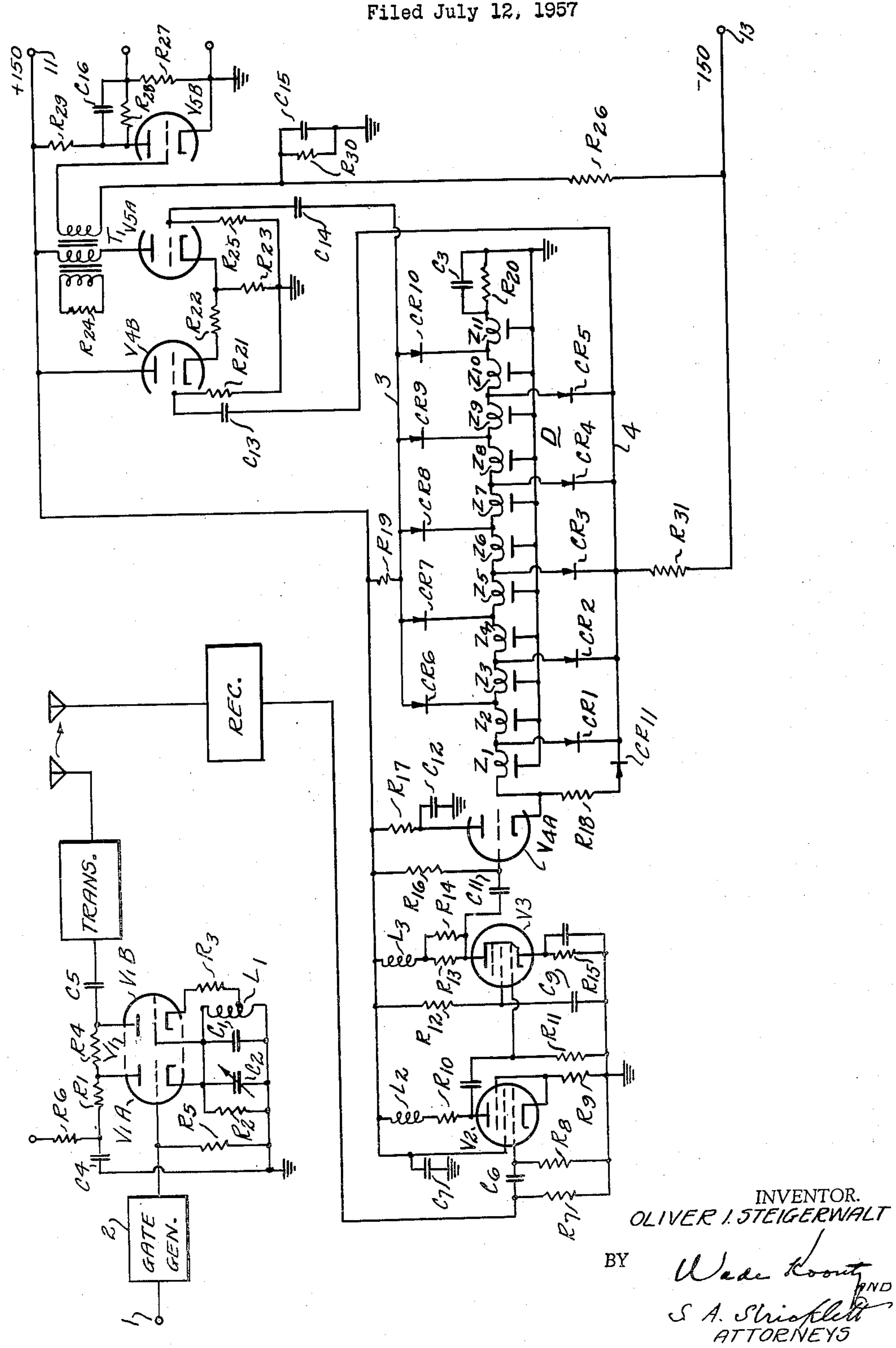
INVENTOR.
OLIVER I. STEIGERWALT
BY Wade Koontz AND S. A. Strickler
ATTORNEYS United States Patent Office 2,968,036

Patented Jan. 10, 1961

2,968,036

RADIANT ENERGY SIGNALLING SYSTEM

Oliver I. Steigerwalt, Wadsworth, Ohio, assignor to the United States of America as represented by the Secretary of the Air Force Filed July 12, 1957, Ser. No. 671,680

4 Claims. (Cl. 343—225)

This invention relates to radiant energy signalling systems and more particularly to radiant energy signalling systems of the type using a synchronizing signal in addition to the intelligence signal.

This application is a continuation in part of application Serial No. 364,582, filed June 29, 1953, now abandoned.

In certain types of radiant energy signalling systems, it is desirable to transmit along with the intelligence or control signals a coded synchronizing or supervisory signal to generate a timing pulse at the receiving end with a maximum degree of security from interference. In that type of system, the synchronizing signal is used to control some circuit or apparatus of the receiver such that the circuit or apparatus will function in synchronism with the transmitted synchronizing signals. In the art of remote control of vehicles or missiles, for example, it is oftentimes essential that the receiver discriminate between the proper synchronizing signal and some other signal such as a "jamming signal" produced by the enemy in an effort to make the vehicle or missile ineffective.

In accordance with the principles of this invention, the radiant energy system is provided with a circuit including a delay line having a number of sections and the potentials along the delay line are used to control a differential circuit and in this manner the differential circuit will only respond when the received signal has exactly the number of cycles for which the delay line is designed.

It is an object of this invention to provide a radiant energy system which will insure security, that is, the system will discriminate between the proper signal and improper signals.

It is a further object of this invention to provide a signal discriminating circuit which is simple in construction and reliable in operation.

The above objects, as well as other objects, features and advantages of this invention will be more thoroughly understood in view of the following description when taken in conjunction with the drawing wherein the single figure is a simplified schematic diagram of a signalling system constructed in accordance with the principles of this invention.

Referring now to the drawing, a signal applied to terminal 1 causes the gate generator 2 to produce an output of 1.0 μsec. duration. That pulse is applied to the control grid of section A of tube V1. Section A of tube V1 together with its associated circuit form a control circuit for the oscillator which includes section B of tube V1 and its associated circuit. The basic circuit of the oscillator is a grounded-plate Hartley oscillator. The frequency-determining tank circuit of the oscillator consists of capacitor C1 in parallal with capacitor C2 and inductor L1. The frequency is adjusted to 5.0 mc./sec.

With the control grid of tube V1A normally at zero bias, its cathode circuit presents a low impedance to the tank circuit and damps out any oscillations. When a negative pulse is applied to the grid of tube V1A, the cathode circuit presents a high impedance to the tank circuit and allows oscillations. The energy stored in inductor L1 by the current through tube V1A discharges into the capacitors C1, C2 of the tank circuit and causes the first cycle of oscillations to be of full amplitude. The negative pulse on the grid of tube V1A is 1.0 μsec. in duration, thus allowing 5.0 cycles of oscillation at 5 mc./sec.

During the period when no negative potential is applied to the grid of V1A, the current through V1A also goes through R1 and when a negative potential is applied to the grid of V1A, the current is cut off. This produces a positive pedestal in the voltage waveform at the plate of V1B. The oscillations in the grid-cathode circuit of V1B are amplified by this tube and appear as oscillations in the plate circuit, superimposed on the pedestal above described.

This composite code signal (5 cycles of 5 mc./sec. and the positive pedestal) is applied to the input of a suitable radiant energy transmitting apparatus. It will be understood that other signals may be simultaneously applied to the input of the transmitter in accordance with well known multiplex principles.

In a preferred embodiment of this invention the transmitter, being used to produce remote control of a guided missile, had video signals as well as the above composite signal simultaneously applied to the input of the transmitter and multiplex operation was accomplished by the well known method of frequency separated subcarriers.

A suitable radiant energy receiver receives the signals radiated from the transmitter and the output of the receiver is applied through a suitable coupling network to the control grid of tube V2 which together with its associated circuit form a first video amplifier whose output is applied to the control grid of tube V3 which together with its associated circuit form a second video amplifier. The circuit constants of those video amplifiers are preferably selected to have such values as to produce uniform response for frequencies between about 20 kc. and 8 mc. or higher. The output of the second video amplifier is applied to the control grid of section "A" of tube V4. Tube V4A together with its associated circuit form a conventional cathode follower whose output impedance is low and will therefore properly match the delay line generally indicated at D.

The delay line D is composed of a plurality of series connected components corresponding to the number of cycles constituting the preselected length of the timing pulses and a final component section Z11. The junctions between components is connected to a grid control conductor 3 by diodes CR6 to CR10 while the mid taps of each component is connected by diodes CR1 to CR5 to base line 4. Also the initial terminal of component section Z1 is connected to base line 4 through a resistor R18 and a diode CR11. Base line 4 is normally at a negative potential because of a connection through resistor R31 to the −150 volt negative terminal 13 except when positive pulses are supplied to base line 4 by any one of the diodes CR1, CR2, CR3, CR4, CR5 or CR11. Positive potential is supplied to grid conductor 3 through resistor R19 from positive terminal 11. However diodes CR6 to CR10 normally maintain conductor 3 at substantially ground potential.

Each of the components Z1 through Z11 (1100 ohm delay line) is adjusted to delay the signal precisely 0.10 μsec. The time between positive peaks of a 5 mc. signal is 0.20 μsec. and, therefore, 0.10 μsec. between a positive peak and the following negative peak. If the signal transmitted (5.0 cycles of 5.0 mc. oscillation, superimposed on a positive pedestal of 1.0 μsec. duration) is applied to the delay network D, then at the instant the first positive peak reaches rectifier CR10, there will also be positive peaks at CR6, CR7, CR8 and CR9. Under this condition a positive pulse will appear on the conductor 3, and be applied to the control grid of V5A, whereas at that instant diodes CR1, CR2, CR3, CR4, CR5 and CR11 are at negative potentials so that a positive potential will not appear on base line 4 and the grid of V4B will be at substantially ground potential. Since V4B together with its associated circuit form a cathode follower which will cause the cathode of V5A to have a positive potential applied thereto when positive potentials appear on base line 4. The grid-cathode bias on V5A is such that the simultaneous conditions described above (pulse on conductor 3; no pulse on base line 4) are required, in order that this tube V5A may pass sufficient current through the primary winding of transformer T1 so that the signal in the secondary winding will exceed the bias applied to the control grid of V5B.

In the absence of the preselected signal in the storage D, one or more of the diodes CR6 to CR10 will reduce the potential of conductor 3 connected to the grid of V5A substantially to ground potential and, at the same time, one or more of the diodes CR1 to CR5 and CR11 will apply a positive pulse to the base line 4 connected to the grid of V4B so that V4B will conduct providing current through R23 to raise the potential of the cathode of V5A above ground to substantially prevent current flow through V5B.

From the above it will be apparent that in order for tube V5B to conduct and thereby produce an output signal, there must be two simultaneous conditions: (1) that there be a pulse at the control grid of tube V5A and (2) that the cathode of tube V5A be at substantially ground potential. Those two conditions will not occur if proper signals are not present at all 10 of the crystal diodes (CR1–CR10) at precisely the correct instant, thus requiring that there be a full five cycles of the correct frequency. It should be noted that Z1 has delayed the signal 0.1 μsec. before it reaches CR1. Therefore, if there are six or more cycles, then, at the instant the first five cycles have set up the proper conditions at CR1 through CR10, a positive peak will be passed by CR11 and the conductor 4 will become positive, thus preventing tube V5A from conducting. Capacitor C3 acts as a short circuit to signals in the frequency band passed by the video amplifier, and thus reflects signals 180° out of phase and sends them back down the delay line. Therefore, at the instant the 2nd through 6th cycles are all adding up at CR1–CR10, the first cycle returns to CR10 out of phase with the second cycle, thus preventing the conductor 3 from swinging positive. The 7th and succeeding cycles are rejected in a similar manner.

In an apparatus such as that shown in the drawing, the values of the circuit elements may be as follows:

| | | |
|---|---|---|
| Tube V1A, V1B | | 12AU7 |
| Tube V2 | | 6AU6 |
| Tube V3 | | 6AN5 |
| Tube V4A, V4B | | 5687 |
| Tube V5A, V5B | | 12AT7 |
| Resistor R1 | ohms | 680 |
| Resistor R2 | do | 8200 |
| Resistor R3 | do | 200 |
| Resistor R4 | do | 180 |
| Resistor R5 | do | 180 |
| Resistor R6 | do | 3300 |
| Resistor R7 | do | 100 |
| Resistor R8 | megohms | 0.1 |
| Resistor R9 | ohms | 68 |
| Resistor R10 | do | 820 |
| Resistor R11 | megohms | 0.1 |
| Resistor R12 | ohms | 2,700 |
| Resistor R13 | do | 3900 |
| Resistor R14 | do | 3900 |
| Resistor R15 | do | 120 |
| Resistor R16 | megohms | 2.2 |
| Resistor R17 | ohms | 1500 |
| Resistor R18 | do | 1000 |
| Resistor R19 | do | 22,000 |

| | | |
|---|---|---|
| Resistor R20 | do | 1200 |
| Resistor R21 | megohms | 0.1 |
| Resistor R22 | ohms | 560 |
| Resistor R23 | do | 1000 |
| Resistor R24 | do | 3,300 |
| Resistor R25 | megohms | 0.1 |
| Resistor R26 | do | .22 |
| Resistor R27 | do | 0.1 |
| Resistor R28 | do | 0.1 |
| Resistor R29 | ohms | 6800 |
| Resistor R30 | do | 8200 |
| Resistor R31 | do | 22,000 |
| Capacitor C1 | μμfd | 12 |
| Capacitor C2 | μfd | 6–25 |
| Capacitor C3 | μfd | 0.1 |
| Capacitor C4 | μfd | 0.1 |
| Capacitor C5 | μμfd | 1000 |
| Capacitor C6 | μμfd | 1000 |
| Capacitor C7 | μfd | 1 |
| Capacitor C8 | μμfd | 1000 |
| Capacitor C9 | μfd | 0.1 |
| Capacitor C10 | μfd | 0.1 |
| Capacitor C11 | μμfd | 1,000 |
| Capacitor C12 | μfd | 0.1 |
| Capacitor C13 | μfd | .047 |
| Capacitor C14 | μfd | .0047 |
| Capacitor C15 | μfd | 0.1 |
| Capacitor C16 | μfd | .01 |
| Inductor L2 | μh | 11.5 |
| Inductor L3 | μh | 41 |

Although this invention has been illustrated and described as applied to the case where the transmitted signal is 5 cycles of 5 mc./sec. frequency, it will be understood that the signal may be any number of cycles and the frequency any desired value provided that the circuit constants are of the proper value and the number of sections of the delay line is made equal to twice the number of cycles plus one.

What is claimed is:

1. In a signalling system having means to radiate an electrical signal including a control pulse having a predetermined number of cycles of a predetermined frequency and means to receive the radiated signal, a discriminator responsive to said control pulse in the received signal comprising a delay line composed of a plurality of serially connected electrically equal sections, each section providing a delay of one-half wave length at the predetermined frequency, the number of sections being equal to twice the predetermined number of cycles plus one, a junction point between each of said sections, a first control conductor, means including a resistor for applying positive potential to said first control conductor, a first group of unidirectional conductors connected between said first control conductor and each even number junction after the input terminal of said delay line, said first group of unidirectional conductors being operative in the absence of a positive potential at each of said even number junctions, to reduce the positive potential of said first control conductor, a second control conductor, a second group of unidirectional conductors connected between each of the odd number junctions, except the final terminal, and said second conductor, means including a resistor for impressing a negative potential on said second control conductor and means including a resistor and a unidirectional conductor for impressing the potential of the input terminal on said second control conductor.

2. A discriminator circuit comprising a delay line having an input terminal and a plurality of sections, said sections having equal electrical delay characteristics of a value such as to delay an input signal of predetermined frequency by an amount equal to one-half cycle of said predetermined frequency, a junction point between each of said sections and its adjacent sections thereby defining a series of junctions, a first common control conductor, connections including an impedance for applying a negative potential on said first common control conductor, a second common control conductor, circuit means including a second impedance for supplying positive potential to said second common control conductor, a unidirectional conductive device of predetermined polarity connected between each odd number junction and said common first conductor, a unidirectional conductive device of said predetermined polarity connected between said input terminal and said common first conductor and a unidirectional conductive device of polarity opposite to said predetermined polarity connected between each even number junction and said common second conductor, whereby when a signal is applied to said input terminal a maximum potential difference will exist between said first common conductor and said second common conductor only when said input signal has said predetermined frequency and has a number of cycles such that the number of said plurality of sections is twice the number of cycles plus one.

3. In a signalling system having means to radiate an electrical signal having a predetermined number of cycles of a predetermined frequency and means to receive said radiated signal, a discriminator circuit for producing a control signal only when said receiver receives a signal having said predetermined number of cycles of said predetermined frequency comprising; a delay line having an input terminal and a plurality of sections, said sections having equal electrical delay characteristics of a value such as to delay an input signal of said predetermined frequency, by an amount equal to one-half cycle of said predetermined frequency, said plurality of sections being equal in number to twice said predetermined number of cycles plus one, a junction point between each of said sections and its adjacent sections thereby defining a series of junctions, a common first control conductor, means including a resistor to apply a negative potential to said common first conductor, a common second control conductor, circuit means including a second resistor for supplying a positive potential to said common second conductor, a unidirectional conductive device of predetermined polarity connected between each odd number junction of said series of junctions and said common first conductor, a unidirectional conductive device of said predetermined polarity connected between said input terminal and said common first conductor and a unidirectional conductive device of polarity opposite to said predetermined polarity connected between each even number junction of said series of junctions and said common second conductor.

4. For use in an electrical signalling system having means to radiate an electrical signal having a predetermined number of cycles of predetermined frequency and a receiver for receiving said radiated signal, a discriminator circuit comprising a delay line having an input terminal adapted to be connected to said receiver, said delay line including a plurality of sections of equal electrical delay characteristics of a value such as to delay a signal of said predetermined frequency by an amount equal to one-half cycle, the number of said sections of said delay line being equal to twice said predetermined number of cycles plus one, a junction point between each of said sections and its adjacent sections thereby defining a series of junctions, a common first control conductor, means including a resistor for applying negative potential to said common first control conductor, a unidirectional conductive device of predetermined polarity connected between each odd number junction of said series of junctionss and said common first conductor, a unidirectional conductive device of said predetermined polarity connected between said input terminal and said common first conductor, a common second control conductor, circuit means including an impedance for supplying positive potential to said second conductor, a unidirectional conductive device of polarity opposite to said predetermined polarity connected between each even number junction of said series of junctions and said common second conductor, said delay line being terminated in an impedance other than its characteristic impedance, a first and a second electron discharge device each having at least an anode, a cathode and a control grid, means to apply potentials on said first common conductor to said control grid of said first electron discharge device, means to apply potentials on said second common conductor to said control grid of said second electron discharge device, a common cathode circuit for said first and said second electron discharge devices, a third electron discharge device having at least an anode, a cathode and a control grid, means to apply variations in the anode-cathode current of said second electron discharge device to said control grid of said third electron discharge device and means to apply to said third electron discharge device a bias of sufficient magnitude to prevent said third electron discharge device from conducting except during the time when said second electron discharge device is conducting at maximum rate.

References Cited in the file of this patent

UNITED STATES PATENTS

| | | |
|---|---|---|
| 2,303,968 | White | Dec. 1, 1942 |
| 2,539,465 | Parker | Jan. 30, 1951 |
| 2,567,203 | Golay | Sept. 11, 1951 |
| 2,592,738 | Rich | Apr. 15, 1952 |
| 2,711,526 | Gloess | June 21, 1955 |